Figure 1:
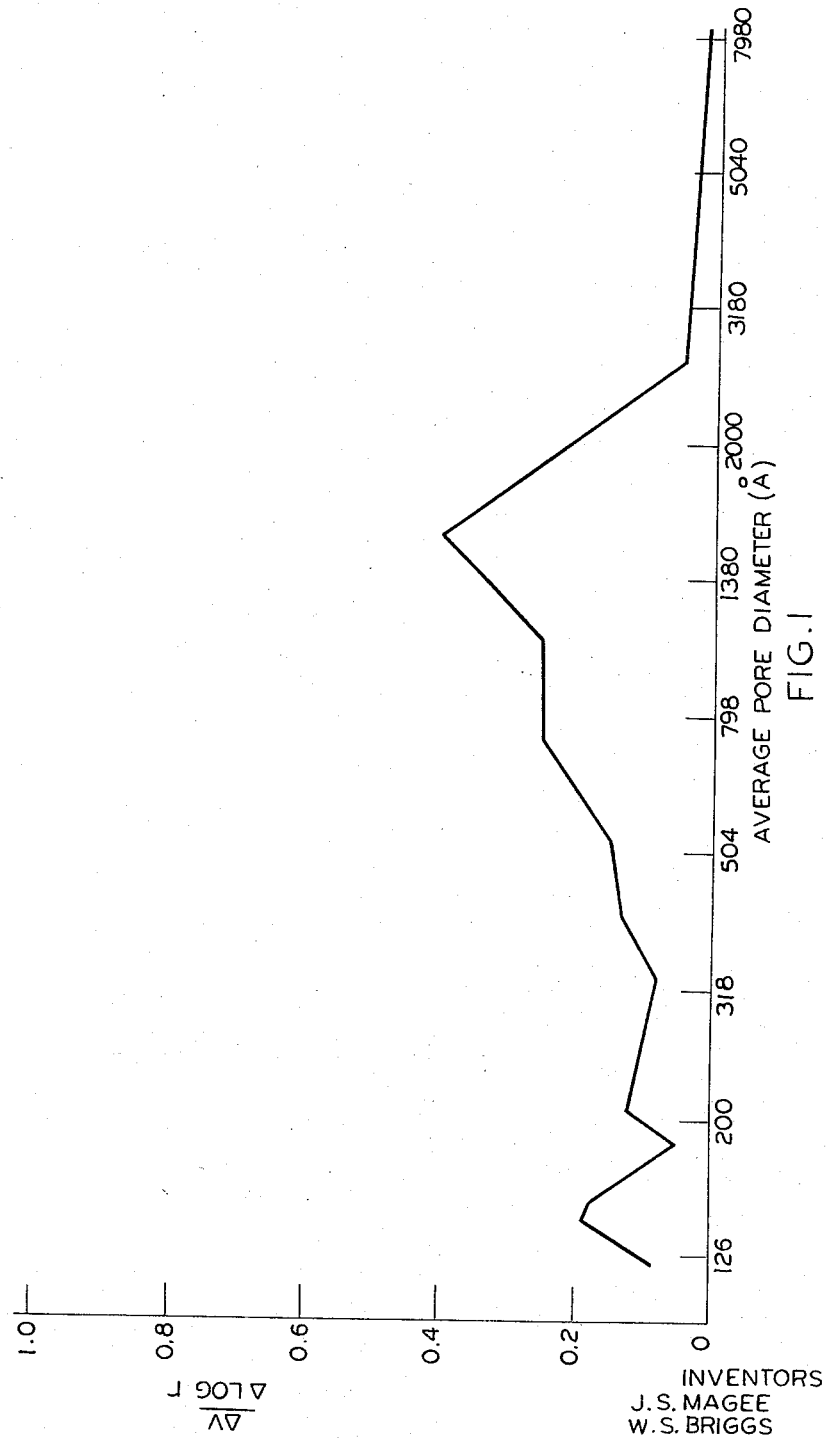

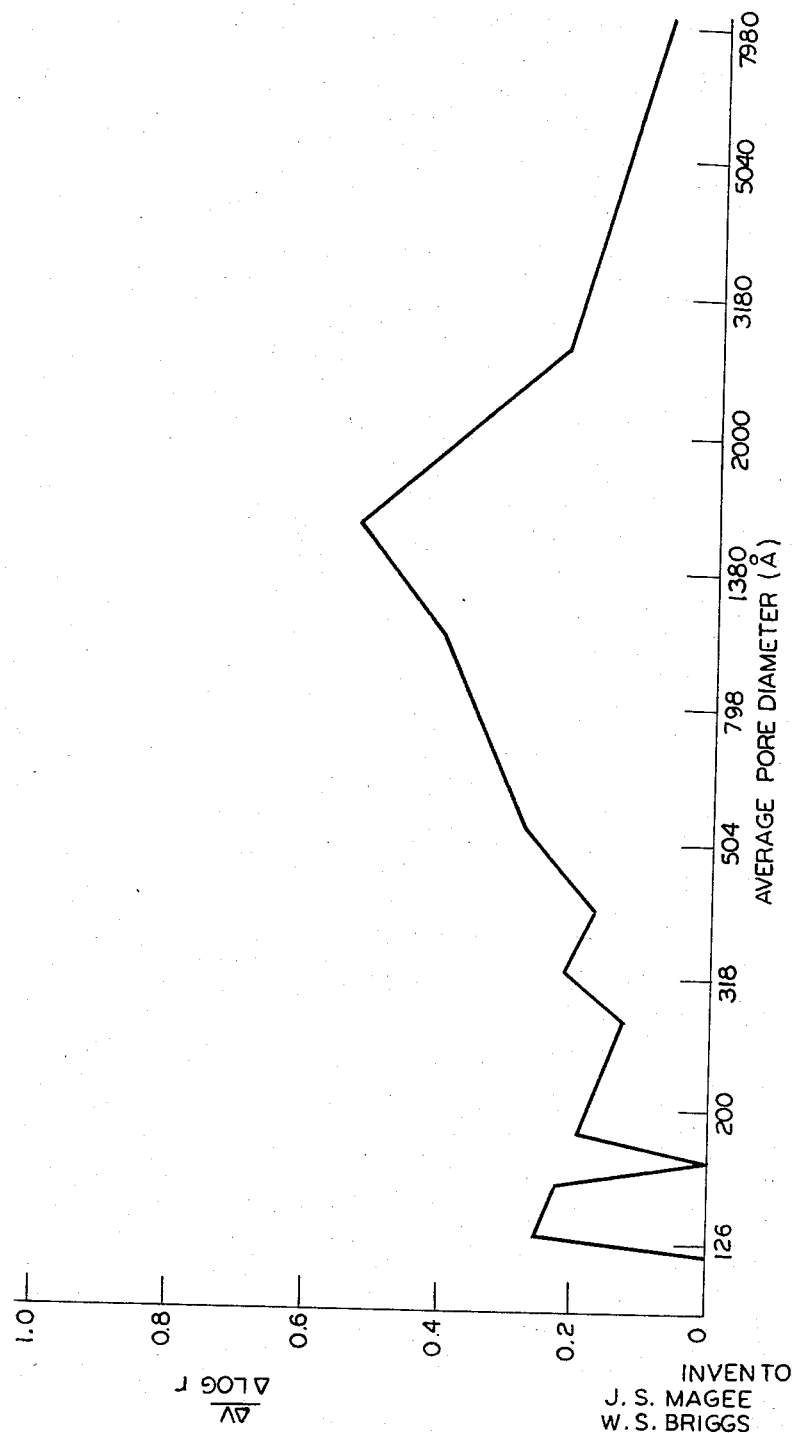

United States Patent Office 3,361,526
Patented Jan. 2, 1968

3,361,526
PROCESS FOR PRODUCING ALUMINA HAVING A NARROW PORE SIZE DISTRIBUTION
John S. Magee, Baltimore, and Warren S. Briggs, Silver Spring, Md., assignors to W. R. Grace & Co., New York, N.Y., a corporation of Connecticut
Filed June 19, 1964, Ser. No. 376,514
The portion of the term of the patent subsequent to May 30, 1984, has been disclaimed
1 Claim. (Cl. 23—143)

This invention relates to the preparation of alumina. In one specific aspect, it relates to a process for preparing alumina in a specific but controllable pore size distribution range.

Aluminas have many applications and are particularly useful as selective adsorbents, catalysts and catalyst supports. For all these uses, alumina in certain pore sizes is most effective and efficient. In the past, however, it has been impossible to prepare an alumina product having a pore size distribution in a narrow preselected range.

Aluminas are generally prepared by precipitation by acid or alkali from an aluminum salt solution. Efforts to prepare alumina having a narrow pore size range have amounted to an "after treatment" of alumina prepared by the standard techniques. The prepared alumina is subjected to some treatment, usually an acid treatment, which results in the elimination of the small pores. However, this method results in a concurrent loss of alumina, often as high as 10%. This, obviously, is not economical in most cases.

We have discovered a method whereby alumina having a narrow pore size distribution within the broad range of 1000 to 2500 A. can be prepared.

Our method consists of precipitating aluminum hydroxide from an aluminum salt solution with an aqueous ammonia solution in which is dispersed small particle-size polyethylene. Calcination of the aluminum hydroxide removes the occluded polyethylene and results in an alumina product having a narrow pore size distribution. For each preparation, the pore size distribution is around a single value within the broad range of 1000 to 2500 A. pore diameter. The products of our invention have mercury pore volumes in the range of 0.24 to 0.54 cc./g.

Briefly, our process comprises preparing an aqueous aluminum salt solution, preparing an aqueous ammonia solution in which is dispersed small particle-size polyethylene, mixing the two solutions, aging the mixture for 14 to 18 hours, drying the precipitate for 20 to 30 hours at 110° C., calcining for 4 to 8 hours at 650° C., and finally recovering the product alumina.

The first step in the process consists of preparing an aluminum salt solution. We have used aluminum nitrate in our process. We have found that substitution of aluminum sulfate in the process does not give the desired product. The solution should be prepared to contain about 28 grams per liter of aluminum (as aluminum oxide); this is equivalent to about a 0.53 molar aluminum nitrate solution.

A 2.2 molar ammonia solution is then prepared in which is dispersed about 1 to 10 percent of small particle-size polyethylene, based on the weight of $Al_2O_3$ present.

Polyethylene having a particle size within the range of 500 to 1500 A. is most suitable for our process. Both polyethylene powder and polyethylene emulsions having the suitable particle size are useful in our process.

The ammonia and aluminum nitrate solutions are mixed together rapidly, then allowed to age for 14 to 18 hours at ambient temperature. The precipitate is separated from excess solution, dried for about 20 to 30 hours at 110° C., and finally calcined for 4 to 8 hours at 650° C.

The porosity characteristics of our product were determined by measuring the mercury pore volume. The mercury pore volume is obtained by forcing mercury into the pores. Mercury is forced into different size pores depending on the pressure exerted. Thus, at 100 p.s.i. absolute pressure, mercury can be forced into pores having a diameter above about 17,500 Angstroms. As the pore size decreases, the amount of pressure required to force mercury into the pores increases. The method is described in detail by H. L. Ritter and L. C. Drake, Ind. Eng. Chem. Anal. Ed. 17, 787 (1945). The mercury pore volume data reported on our products were measured at pressures from 0 to 15,000 p.s.i. using a standard mercury porosimeter.

Our invention will be further explained by the following specific but non-limiting examples.

Example I

This run demonstrates a typical preparation of our product. A total of 50 grams of $Al(NO_3)_3 \cdot 9H_2O$ was dissolved in deionized water to make 250 ml. of solution.

An ammonia solution was prepared by diluting 150 ml. of concentrated $NH_4OH$ (28% $NH_3$) to 1 liter. A total of 0.35 gram of polyethylene emulsion (containing 0.07 gram of polyethylene having particles with a diameter of about 50 m$\mu$) was dispersed in the ammonia. This was 1% polyethylene based on the weight of alumina.

The two solutions were mixed rapidly and stirred for about 10 minutes. The mixture was aged for 16 hours at ambient temperature, filtered and dried for 24 hours at 110° C. Finally, the material was calcined for 5 hours at 650° C. and the product alumina recovered.

The mercury pore volume of our product as determined by the method previously described was 0.255 cc./g. The pore diameter distribution is shown in FIGURE 1.

$$\Delta V / \Delta \log r$$

in the figure represents change in pore volume divided by change in log of the pore radius. The maximum peak occurs at about 1500 A. pore diameter which represents the maximum pore diameter distribution of our product.

Example II

In this run, the product was prepared using a commercially available polyethylene emulsion containing the same amount of polyethylene used in Example I.

The aluminum salt solution was prepared by dissolving 50 grams of $Al(NO_3)_3 \cdot 9H_2O$ in sufficient dionized water to make 250 ml.

A total of 0.18 gram of polyethylene emulsion (containing 0.07 gram of polyethylene having a particle size of 50 m$\mu$) was dispersed in one liter of an ammonia solution containing 150 ml. of concentrated $NH_4OH$ (28% $NH_3$).

The two solutions were mixed rapidly and stirred for about 10 minutes. The mixture was aged at ambient temperature for 16 hours, filtered, and the precipitate dried for 24 hours at 110° C. Finally, the alumina was calcined for 5 hours at 650° C.

Figure 2:
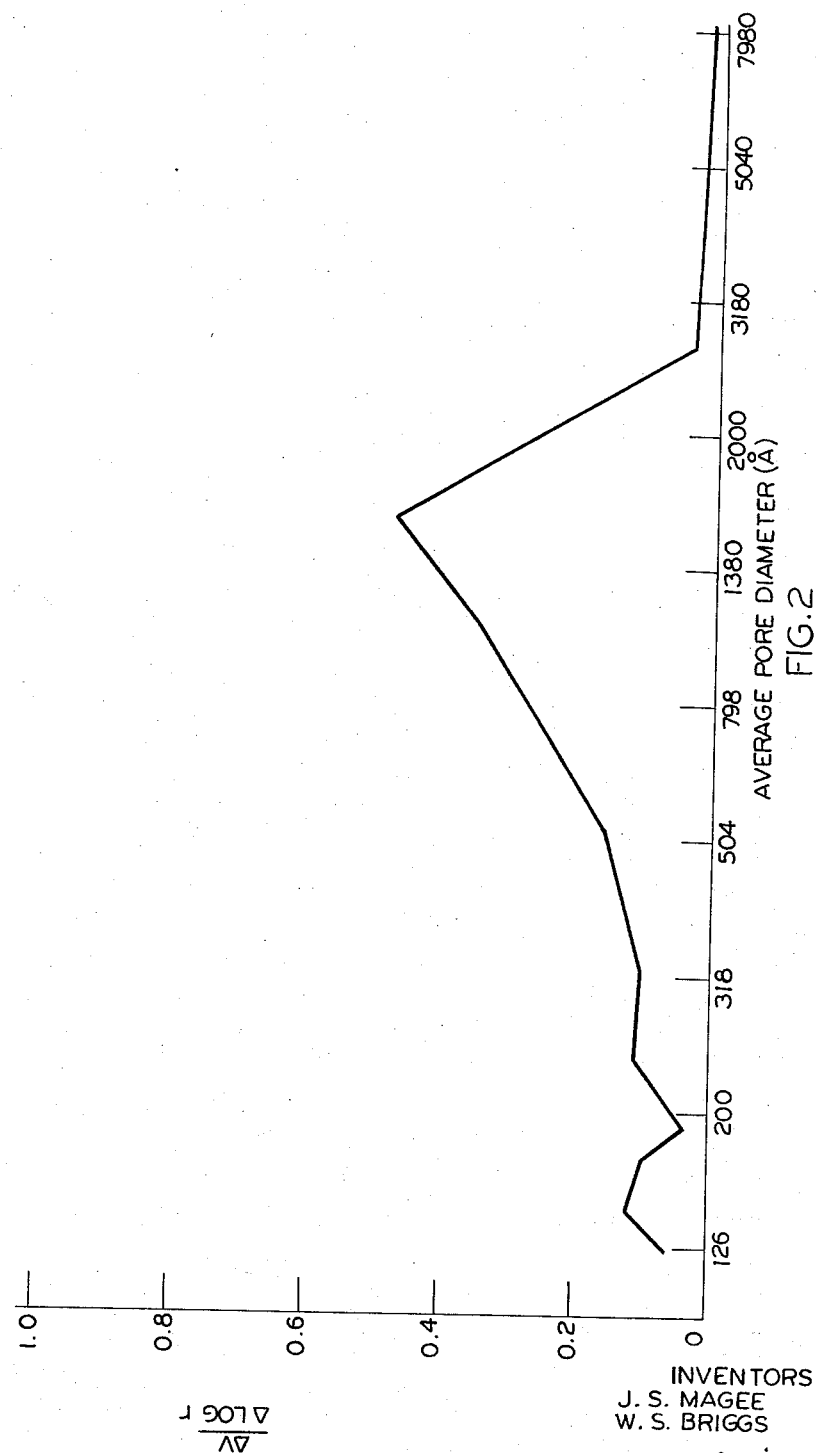

The total mercury pore volume of the product was 0.252 cc./g. The maximum pore diameter distribution was about 1500 A. which is shown in FIGURE 2.

It is seen that commercially available polymer can be used in the preparation and has very little effect on the total mercury pore volume or the pore diameter distribution peak.

Example III

This run was made using dry polyethylene rather than an emulsion.

A total of 50 grams of $Al(NO_3)_3 \cdot 9H_2O$ was dissolved in sufficient deionized water to make 250 ml. of solution.

An ammonia solution was prepared by diluting 150 ml. of concentrated $NH_4OH$ to one liter. 0.07 grams of dry polyethylene having a particle size of 50 mµ were dispersed in the ammonia solution. This represents 1% polyethylene based on the weight of alumina.

The two solutions were mixed rapidly and stirred for 10 minutes. The mixture was aged for 16 hours at ambient temperature, then filtered and dried for 24 hours at 110° C. The dried alumina was calcined for 5 hours at 650° C.

Figure 3:
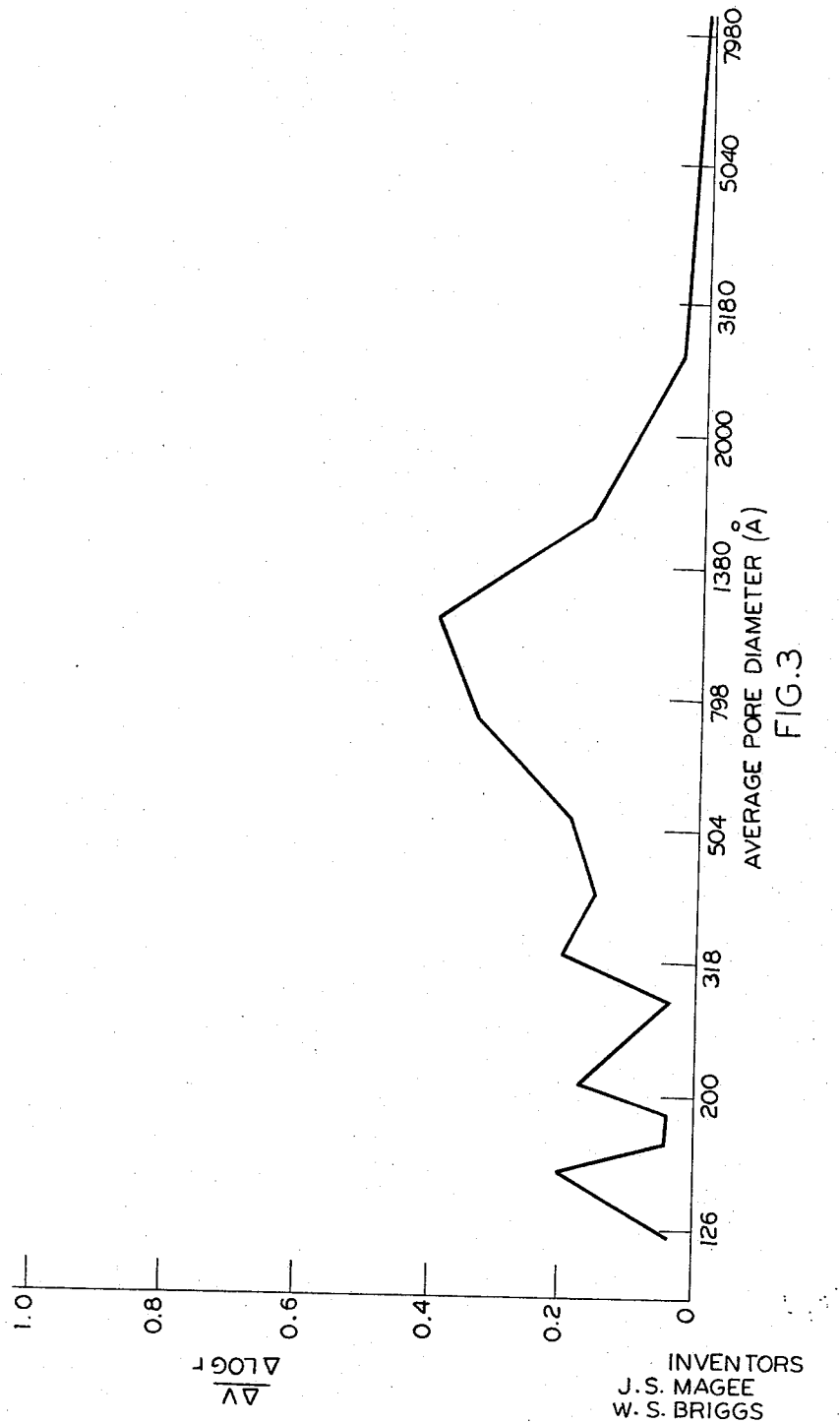

The total mercury pore volume of the product was 0.240 cc./g. The maximum pore diameter distribution was about 1000 A., as shown in FIGURE 3.

*Example IV*

In this run, 10% polyethylene based on the weight of the alumina was used.

50 grams of $Al(NO_3)_3 \cdot 9H_2O$ were dissolved in deionized water to make 250 ml. of solution.

An ammonia solution was prepared by diluting 150 ml. of concentrated $NH_4OH$ to one liter. A total of 3.5 grams of polyethylene emulsion (containing 0.7 gram of polyethylene having a particle diameter of 50 mµ) was dispersed in the ammonia.

The two solutions were mixed rapidly and stirred for 10 minutes. The mixture was aged for 16 hours at ambient temperature, then filtered and dried for 24 hours at 110° C. The dried alumina was calcined for 5 hours at 650° C.

The total mercury pore volume was 0.54 cc./g. The maximum pore diameter distribution was about 1500 A. as shown in FIGURE 4.

These results show that use of the high percent polyethylene results in a product having a high mercury pore volume but a distribution peak within the desirable range of 1000 to 2500 Angstroms.

What is claimed is:

1. A process for preparing porous alumina having a narrow pore size distribution within the range of 1000 to 2500 Angstroms, which comprises preparing an aqueous aluminum nitrate solution containing about 28 grams of aluminum as aluminum oxide per liter, preparing an ammonia solution in which is dispersed 1 to 10% of polyethylene, based on the weight of $Al_2O_3$ present, having a particle size of 500 to 1500 Angstroms, admixing the two solutions to precipitate aluminum hydroxide, aging the mixture for 14 to 18 hours, separating the precipitate from excess solution, drying the precipitate for 20 to 30 hours at 110° C., calcining for 4 to 8 hours at 650° C., and finally recovering the product alumina.

References Cited

UNITED STATES PATENTS

| 2,166,868 | 7/1939 | Jones | 23—143 X |
| 2,211,745 | 8/1940 | Stephenson | 23—143 X |
| 2,256,505 | 9/1941 | Thompson | 23—143 X |
| 2,697,066 | 12/1954 | Sieg. | |
| 3,193,349 | 7/1965 | Mooi | 23—143 |

MILTON WEISSMAN, *Primary Examiner.*

OSCAR R. VERTIZ, *Examiner.*

H. T. CARTER, *Assistant Examiner.*